J. A. Bertola.
Treating Ores.
Nº 42341    Patented Apr. 19, 1864

Witnesses.    Inventor.
Lemuel W. Serrell    Joseph Alcide Bertola
Thos Geo. Harold

UNITED STATES PATENT OFFICE.

JOSEPH A. BERTOLA, OF NEW YORK, N. Y.

IMPROVEMENT IN CHILIAN MILLS FOR PULVERIZING METALLIC ORES.

Specification forming part of Letters Patent No. 42,341, dated April 19, 1864.

*To all whom it may concern:*

Be it known that I, JOSEPH A. BERTOLA, of the city and State of New York, have invented, made, and applied to use a certain new and useful Improvement in the Chilian Mill for Pulverizing Metallic Ores and Other Substances; and I do hereby declare the following to be a full, clear, and exact description of my said invention, reference being had to the annexed drawings, making a part of this specification, wherein—

Figure 1:
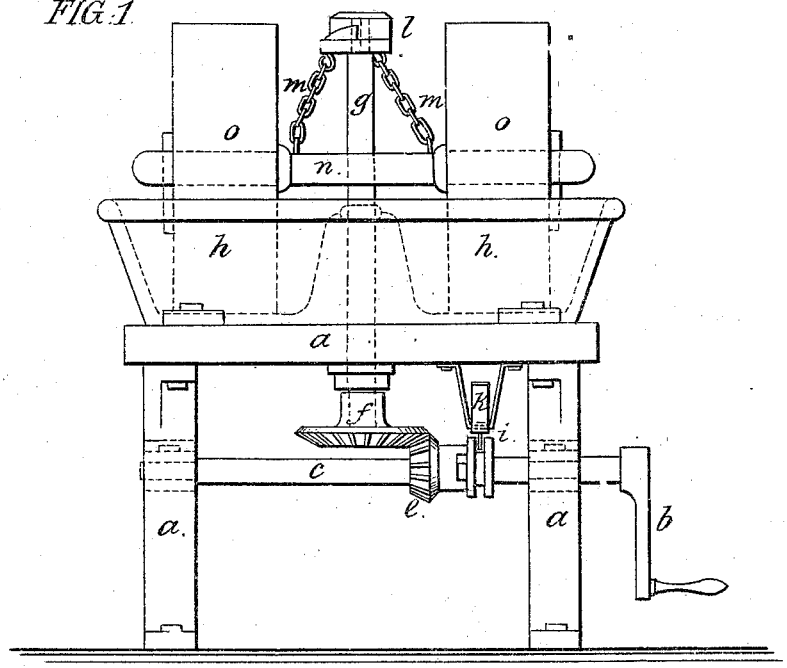
Figure 2:
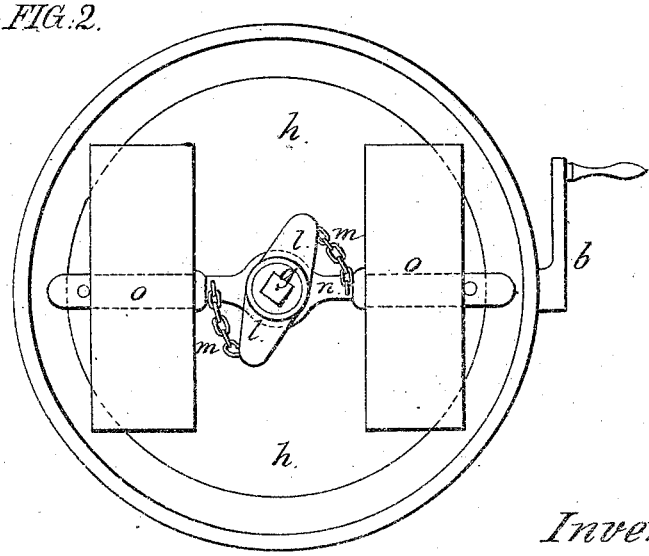

Figure 1 is a side elevation of my said mill, showing my improvement, and Fig. 2 is a plan of the same.

Similar marks of reference denote the same parts.

Mills have heretofore been constructed with a pair of pulvering-rollers on a cross-axle driven by a vertical shaft, said rollers acting upon the metallic ores placed in an annular basin, said mills being known as the "Chilian mill."

In cases where one roller is raised by passing over a lump of ore a strain comes upon the axle and friction at the point of connection between the axle and vertical-shaft, which tend to injure the axle and produce wear in the parts, as well as involving a geat loss of power.

The nature of my said invention consists of a separate cross-head on the vertical shaft with links or chains connected to the axle of and near to the pulverizing-rollers, whereby the rollers are drawn around through the agency of said links and are free to rise or fall in passing lumps of ore, &c., without undue strain or friction, the chains or links allowing of this movement with great ease, and the rollers accommodate themselves so easily to the material in the annular basin that much less power is required than with the old character of mill.

In the drawings, $a$ is a frame-work of any suitable character. $b$ is a crank or other device by means of which the shaft $c$ is rotated with the desired speed; and $e$ is a pinion thereon taking the wheel $f$ on the vertical shaft $g$, that passes through the center of the annular basin or trough $h$. $i$ is a sliding coupling on $c$, actuated by a lever, $k$, by means of which the pinion $e$ is uncoupled or coupled. By placing this gearing below the mill there is no trouble experienced from grease getting into the pulverizer.

Upon the squared upper end of the shaft $g$, I fit the cross-head $l$, from the ends of which chains or links $m$ pass to eyes on the axle $n$ of the pulverizing-rollers $o\ o$, and said axle $n$ is made with an eye in its center to freely pass the shaft $g$.

It will now be evident that the shaft $g$ and cross-head $l$ draw the pulverizing-rollers $o\ o$ around in the annular basin $h$ by means of the chains or links $m\ m$ acting upon the axle $n$ near the inner face of each pulverizing-roller, and hence the rollers are free to rise or fall in passing over lumps of ore, and the axle $n$ is relieved from strain as much as possible, as the power acts thereon near to the rollers and said axle has only to guide the rollers in their rotation and progression around the trough.

What I claim, and desire to secure by Letters Patent, is—

The cross-head $l$ on the shaft $g$ with the chains or links $m\ m$, in combination with the axle $n$ and pulverizing-rollers $o\ o$, as and for the purposes specified.

In witness whereof I have hereunto set my signature this 31st day of August, A. D. 1863.

JOSEPH ALEIDE BERTOLA.

Witnesses:
LEMUEL W. SERRELL,
THOS. GEO. HAROLD.